United States Patent [19]

Inklaar

[11] 3,897,567
[45] July 29, 1975

[54] NON-ADHERENT WRAPPING OF SHAPED PROTEIN FOOD PRODUCTS

[75] Inventor: Petrus Adam Inklaar, Diepenveen, Netherlands

[73] Assignee: Vasco Industries Corporation, Yonkers, N.Y.

[22] Filed: May 3, 1973

[21] Appl. No.: 356,815

[30] Foreign Application Priority Data
May 8, 1972  Netherlands...................... 7206173

[52] U.S. Cl. .................... 426/8; 426/106; 426/129; 426/135; 426/415; 426/811
[51] Int. Cl. ........................ A23b 1/10; A23c 19/16
[58] Field of Search .......... 426/8, 125, 392, 315, 7, 426/323, 129, 106, 135, 415, 811

[56] References Cited
UNITED STATES PATENTS
3,510,318   5/1970   Kernbach............................ 426/315

Primary Examiner—A. Louis Monacell
Assistant Examiner—R. A. Yoncoskie
Attorney, Agent, or Firm—Albert C. Johnston

[57] ABSTRACT

Shaped protein containing food products such as rolled meat, sausage, cheese, or meat paste, are packed in wrappings such as nettings, skins or casings which, by virtue of contacting the products through a certain composition of an enzyme and a pH control agent, do not objectionably soften the products yet can be removed readily, without tearing off pieces of the products, after storage, cooling, deep freezing, thawing and/or cooking or other heat treatment of the products in the wrappings. The enzyme is one, e.g. pepsin, that does not act appreciably at the pH of the food product; the pH control agent in the presence of moisture creates a pH at which the enzyme is active.

16 Claims, No Drawings

NON-ADHERENT WRAPPING OF SHAPED PROTEIN FOOD PRODUCTS

This invention relates to the problem of creating wrapping or packing means that are non-adhering or non-sticking to the wrapped product, especially such means as used for packing foodstuffs. The removal of the wrapping means may cause difficulties in the sense that parts of the product adhere to the wrapper and are wasted or make the appearance of the product unsightly or both.

This problem occurs for instance in the removal of sausage casings, with dry sausage as well as with cooking sausage; in removing the skin from frankfurters; in the removal of stockinettes or other woven or knitted envelopes of meat and meat products; and in the removal of paper in which cheese, pate or like protein containing food products are enclosed.

The need for a non sticking envelope is greatest for products which after preparation and storage, whether or not at lower temperature, are subjected to a heat treatment such as cooking, grilling, baking, roasting or smoking, after which treatment the wrapping means have to be removed. The wrappings of rolled roasts, sausage or ham in nettings or other open mesh or perforated envelopes having openings of some 0.3 to 5 mm and more in size, made from yarns or sheets of cotton fibers, nylon, jute and other natural or synthetic fibers, possibly provided with elastic cores, have to be removed before consumption but after heating of the meat products. In many cases parts of the meat are torn off from the exterior of the product and leave a misshapen and often barely sliceable product.

Numerous solutions for this problem have been tried out. For instance, the insides of sausage casings have been covered with cellulose derivatives, proteins, silica gel and alginates, in order to improve the peeling of frankfurters and similar products, which often is done with mechanical peeling devices, and to reduce the amount of waste. For nettings the use of oils, sometimes in combination with other substances, especially lecithin, has been proposed. Nettings have also been treated with aqueous solutions of enzymes, especially papain, to prevent crust formation around the threads. Here, however, the difficulty arose that, especially in the wrapping of heterogeneous material such as lumps of meat having fatty parts, the enzyme diffused too fast to the inside and converted to a much too high degree the proteins within the meat product into a homogeneous, often somewhat granular, and sometimes even weak mass.

The present invention provides a material and a method to prevent sticking of the wrapping to the wrapped product and to prevent at the same time the enzyme action on the interior part of the product.

According to the invention, an extremely thin coating or layer is provided between the contacting surfaces of the product and the envelope, which coating or layer contains both an enzyme and a component which in an aqueous medium causes the pH of the enzyme containing layer or coating to come within the activity range of the enzyme, which range is different from the pH range of the wrapped product, said enzyme and/or pH regulator being present in such a low quantity or having such a low diffusion rate that only at the surface of the wrapped product an extremely small enzymatic conversion occurs which stops when the enzyme penetrates or has penetrated further into the wrapped product because the pH at such location is such that the enzyme is practically inactive.

For a ham having a pH of 6.3 one selects an enzyme which is active either in a more strongly acid or in the alkaline region and which may only have a negligable action at a pH of 6.3. So one may use pepsin or a protease which latter may work at a pH of 8–11.

To reach a pH of 1–4 for activating pepsin, one has to add also an acid such as succinic acid, citric acid, ascorbic acid, tartaric acid or others, or acid salts such as sodium bisulphate, mono potassium phosphate, or others. One may advantageously use a buffering mixture, such as hydrochloric acid and disodium citrate, glycine with sodium chloride and hydrochloric acid, or an acid alkali phosphate with, if needed, free phosphoric acid. For alkali proteases one may add substances such as sodium carbonate, sodium hydroxide and glycine (buffering), alkali phosphates and phosphate mixtures (buffering) and many other substances or mixtures known as such to bring the pH within the desired range.

Examples of enzymes are alkaline protease, obtainable from Kyowa Hakko K.K., Tokyo (active pH range about 9.5 to 11.5), acid protease from the same company (active pH range 1.5 to 2.5), pepsin from Merck Nederland N.V., Amsterdam (active pH range from about 1.0 to 4.0).

The production or formation of the intermediate film according to the invention may be carried out in different ways which per se are known. For instance, netting, sausage casings or paper may be conducted through an aqueous solution containing the enzyme as well as the pH controlling ingredient, or first through a solution containing one ingredient and then through a solution containing the other one. After removing the excess of liquid by dripping, centrifuging or in any other way the product is introduced into the impregnated wrapping material and stored, if needed, after cooling or deep freezing. The final product may be smoked, which normally is done industrially, or baked, roasted, grilled, cooked, etc., which may also be done by the housewife. Even when a product wrapped in netting is for a shorter or longer period in contact with appreciable quantities of water, as on cooling and on defrosting after deep freezing, enough enzyme and controlling agent remains in the wrapping to prevent adhesion and crust formation during later processing.

One may also soak the wrapping material in the desired solution and dry it below the degradation temperature of the enzyme, which generally is done by sublimation drying.

One may also apply the enzyme and the pH controlling agent by dusting, with advantage after having treated the wrapping means with an adhesive agent such as dextrine, starch, tragacanth gum or the like. If needed a drying process may follow. The agents may be dispersed or dissolved in the adhesive liquid and applied by soaking or brushing.

Evidently the separating layer may contain next to the enzyme and pH controller other substances known in the relevant industry as diluting or preserving means for enzymes. Such means may be applied by dusting or drenching or in any other known way.

Papain, an enzyme proposed for packing meat, is active over a very extended pH range and appeared to penetrate to such extent into the meat that the quality fell off considerably. The activity range of papain is pH 4 to 9.

According to the invention a diffusion or penetration, for instance along the boundary planes of a heterogeneous mixture containing meat lumps, is not important, as a combination containing for example pepsin and citric acid may lose some pepsin to the interior of the ham or sausage but citric acid, to the extent that it penetrates with the pepsin, is rapidly neutralized by the surface pH of the meat (pH 5.8–6.5) so that the pepsin comes into a medium where it practically has no further activity. It should be borne in mind that the initial concentrations of the enzyme and/or pH regulator are so extremely low that even at full activity the practical effect is limited to a very thin surface layer of, for instance, 0.1 to 3 mm. in depth, depending also on the shape of the product. The quantities to be used can easily be determined by applying the desired coating or formation of the separating layer and, after increasing storing times of the wrapped product, analysing the activity of the enzyme at increasing distances from the surfaces of the product. The activity of the enzyme can be determined in any known way, such as by hydrolysis of casein by the enzyme under reaction conditions defined for the type of enzyme, followed by a determination of the quantity of tyrosine formed.

The invention is further illustrated by the following examples:

EXAMPLE I

Adhesion of a netting (stockinette) to rolled chicken roast:

A nylon netting was used having a mesh of 2 × 2 mm in unstretched condition.

A study was made to determine the influence of pepsin and citric acid as a means to prevent adhesion of the netting during baking.

Eight variations were tried as follows:

The rolled roasts, having a pH of 5.9, were shaped and manually enveloped by the netting. The rolls were frozen at −40°C, stored during 7 days and defrosted during 16 hours at 10°C. The pepsin contained 35,000 Anson units per gram as determined according to the Anson method by hydrolysis of casein by the pepsin under the reaction conditions defined for pepsin, followed by a determination of the quantity of tyrosine formed in this way.

This experiment served to determine the required quantities.

EXAMPLE II

A number of enzymes was compared for enclosing rolled pork roasts in the netting described in Example I.

A. 2 g of pepsin (70,000 A.U.) and 8 g of citric acid were dissolved in 100 ml water. The pH was 1.08.

B. 2 g acid protease and 8 g of citric acid were dissolved in 100 ml water. The pH was 1.47.

C. 2 g alkaline protease with 4 g lysine.HCl and 4 g sodium glycinate were dissolved in 100 ml water. The pH was 9.84.

D. 2 g papain and 8 g sodium chloride were dissolved in 100 ml water. The pH was 4.80.

E. Blank without netting treatment.

The nettings were conducted through the solutions and then centrifuged until each treated netting had about the same enzyme activity as the others. All experiments were carried out with 100 rolled roasts weighing about one kg each.

After having passed through the solution the netting was used to mechanically pack the rolled roasts. After having been kept during 4 hours at 18°C. the product was frozen by blow freezing. After 3 days the roasts were defrosted by storing during 16 hours at 20°C. The rolled roasts were then baked in the usual way by short broiling followed by simmering with the addition of water.

A panel of experts in the field of meat cooking (10 members) evaluated the adhesion of the netting to the meat and the change in meat quality in comparison with a number of rolled pork roasts enveloped in untreated netting but broiled and simmered in the same way and for the same periods.

| number | treatment of netting | quantity of additive | pH of pepsin acid mixture in water (0.5% sol.) | result |
| --- | --- | --- | --- | --- |
| 1 | untreated | 0 | 7 | strong adhesion to netting |
| 2 | treated with water | 0 | 6.5 | same as 1 |
| 3 | treated with citric acid | 200 mg/netting | 2.5 | same as 1 |
| 4 | treated with citric acid and pepsin | 50 mg acid + 12 mg pepsin (= 425 A.U.) | 1.1 | same as 1 |
| 5 | as 4 | 100 mg acid + 24 mg pepsin (= 850 A.U.) | 1.1 | same as 1 |
| 6 | as 4 | 200 mg acid 48 mg pepsin (= 1700 A.U.) | 1.1 | no adhesion to netting |
| 7 | as 4 | 400 mg acid + 96 mg pepsin (= 3400 A.U.) | 1.0 | same as 6 |
| 8 | as 4 | 1000 mg acid + 240 mg pepsin (8500 A.U.) | 1.0 | no adhesion but penetration more than 6 mm below the meat surface |

A.U. = Anson Units.

The results were as follows:

| series | adhesion to netting | quality of the roasted meat |
| --- | --- | --- |
| A | no worthwhile adhesion | very good |
| B | some adhesion, but without influence on meat structure | just sufficient |
| C | as B | good |
| D | as A | "mushy" structure, not acceptable |
| E | very strong adhesion | on removal of netting in most cases tearing out of meat lumps. unacceptable product. |

EXAMPLE III

A meat mixture for preparing Frankfurters had the following composition:
12 kg beef,
16 kg beef head meat,
28 kg cheeks,
20 kg back bacon,
30 kg water/ice,
6 kg ham cuttings,
3 kg isolated soy protein, curing salt (NaCl + NaNO$_2$), spices.

The stuffing was mechanically packed in the tubing and smoked at 80% relative moisture content and 60°C. Then the skin was mechanically removed. Non-treated skin gave 3% waste, skin treated with pepsin-citric acid (1:4) solution gave 0.3 waste.

I claim:

1. A packed shaped protein-containing food product such as meat, sausage, cheese, or meat paste, comprising a shaped mass of the food product enveloped in a wrapping and having at the contacting surfaces of said wrapping and said mass a composition comprising an enzyme that is practically inactive at the pH of said mass and a pH control agent that creates in the presence of moisture a pH at which said enzyme is active, said enzyme and said pH control agent being present in quantities sufficient to inhibit adhesion of the wrapping to the food product yet so limited that the enzyme will act in only a limited surface layer of said mass in the presence of moisture.

2. A product according to claim 1, said wrapping being a netting of yarns or threads forming an open mesh structure having meshes at intervals of from 1 to 5 mm. and having said composition impregnated therein and in dry condition.

3. A product according to claim 1, said wrapping being of a sheet material carrying said composition at least on the side thereof contacting said mass.

4. A product according to claim 1, said mass being of a meat or meat mixture having a surface pH in the range of about 5.8–6.5, said enzyme being a protease that is active in a pH range more strongly acid than said mass and said pH control agent comprising a normally solid water soluble acid or acid salt.

5. A product according to claim 1, said mass being of a meat or meat mixture having a surface pH in the range of about 5.8–6.5, said enzyme being a protease that is active in a pH range of about 8 to 11, and said pH control agent comprising a normally solid water soluble substance having an alkaline reaction in the presence of water.

6. A product according to claim 1, said mass being of a meat or meat mixture having a surface pH in the range of about 5.8–6.5, said enzyme being pepsin and said pH control agent comprising a normally solid water soluble acid or acid salt.

7. A product according to claim 1, said mass being of a meat or meat mixture having a surface pH in the range of about 5.8–6.5, said enzyme being pepsin and said pH control agent comprising citric acid.

8. A product according to claim 1, said mass being of a meat or meat mixture having a surface pH in the range of about 5.8–6.5, said wrapping being a netting of yarns or threads forming an open mesh structure having meshes at intervals of from 1 to 5 mm. and having said composition impregnated therein and in dry condition, said enzyme being pepsin and said pH control agent comprising citric acid.

9. A wrapping for packing a shaped mass of a protein containing food product such as meat, sausage, cheese, or meat paste, comprising a wrapping material adapted to envelope said mass and carrying at least on the side thereof that will contact said mass a composition comprising an enzyme that is practically inactive at the pH of said mass and a pH control agent that creates in the presence of moisture a pH at which said enzyme is active, said enzyme and said pH control agent being present in quantities sufficient to inhibit adhesion of said material to the food product yet so limited that the enzyme will act in only a limited surface layer of said mass in the presence of moisture.

10. A wrapping according to claim 9, said material being a netting of yarns or threads forming an open mesh structure having meshes at intervals of from 1 to 5 mm. and having said composition impregnated therein and in dry condition.

11. A wrapping according to claim 9, said material being a sheet material adapted to form a skin or casing on said mass and having said composition impregnated therein and in dry condition.

12. A wrapping according to claim 9, said material being a sheet material adapted to form a skin or casing on said mass and carrying at least on said side thereof a thin coating of said composition.

13. A wrapping according to claim 9, said enzyme being a protease that is active in a pH range of about 8 to 11, and said pH control agent comprising a normally solid water soluble substance having an alkaline reaction in the presence of water.

14. A wrapping according to claim 9, said enzyme being pepsin and said pH control agent comprising a normally solid water soluble acid or acid salt.

15. A wrapping according to claim 9, said enzyme being pepsin and said pH control agent comprising citric acid.

16. A wrapping according to claim 9, said material being a netting of yarns or threads forming an open mesh structure having meshes at intervals of from 1 to 5 mm. and having said composition impregnated therein and in dry condition, said enzyme being pepsin and said pH control agent comprising citric acid.

* * * * *